(12) United States Patent
Wang et al.

(10) Patent No.: US 11,597,540 B2
(45) Date of Patent: Mar. 7, 2023

(54) ELECTROMAGNETIC LOCK RELEASE MECHANISM AND METHOD FOR SEPARATING SATELLITE FROM ROCKET

(71) Applicant: TSINGHUA UNIVERSITY, Beijing (CN)

(72) Inventors: Zhaokui Wang, Beijing (CN); Yunhan He, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 15 days.

(21) Appl. No.: 17/295,047

(22) PCT Filed: Dec. 15, 2020

(86) PCT No.: PCT/CN2020/136506
§ 371 (c)(1),
(2) Date: May 19, 2021

(87) PCT Pub. No.: WO2021/143428
PCT Pub. Date: Jul. 22, 2021

(65) Prior Publication Data
US 2022/0267033 A1    Aug. 25, 2022

(30) Foreign Application Priority Data
Jan. 16, 2020   (CN) .......................... 202010046521.6

(51) Int. Cl.
*B64G 1/64*    (2006.01)
*B64G 1/00*    (2006.01)

(52) U.S. Cl.
CPC ............. *B64G 1/645* (2013.01); *B64G 1/005* (2013.01)

(58) Field of Classification Search
CPC .......... B64G 1/645; B64G 1/005; B64G 1/64; B64G 1/646; B64G 1/66
See application file for complete search history.

(56) References Cited

U.S. PATENT DOCUMENTS 4,324,374 A * 4/1982 Wittmann ................ B64G 1/14
244/173.3
4,506,852 A * 3/1985 Adams ................... B64G 1/648
124/16

(Continued)

FOREIGN PATENT DOCUMENTS

CN           107054700 A    8/2017
CN     201710203183.0       8/2017

(Continued)

*Primary Examiner* — Medhat Badawi
*Assistant Examiner* — Vicente Rodriguez

(57) ABSTRACT

An electromagnetic lock release mechanism includes: a frame, an ejection unit, a satellite unit, a lock release unit, and a lock release drive unit; the ejection unit includes an ejection spring, an ejection jack, and a spring sleeve; the lock release unit includes a locking pin, a locking slider, an unlocking spring, and a base; the lock release drive unit includes an electromagnet limit nut, an electromagnet moving core, and an electromagnet. Advantages of the present invention are as follows. The present invention is a point positioning lock release mechanism that can be used to separate micro-satellites and rockets and repeatedly tested, which provides reliable locking and separating of satellites and rockets in a complex mechanical environment, and can be repeatedly tested on the ground. The separation is entirely a mechanism action without pollution.

4 Claims, 13 Drawing Sheets

(56) References Cited

U.S. PATENT DOCUMENTS

| | | | | |
|---|---|---|---|---|
| 4,679,752 A * | 7/1987 | Wittmann | ............... | B64G 1/645 244/173.3 |
| 5,860,624 A * | 1/1999 | Obry | ....................... | F42B 12/60 244/39 |
| 6,126,115 A * | 10/2000 | Carrier | ................... | B64G 1/641 294/82.26 |
| 6,896,441 B1 * | 5/2005 | Champagne | ........... | B64G 1/645 244/173.1 |

FOREIGN PATENT DOCUMENTS

| | | |
|---|---|---|
| CN | 108116697 A | 6/2018 |
| CN | 201711296549.X | 6/2018 |
| CN | 108516111 A | 9/2018 |
| CN | 108583940 A | 9/2018 |
| CN | 201810383644.1 | 9/2018 |
| CN | 201810562615.1 | 9/2018 |
| CN | 110329552 A | 10/2019 |
| CN | 201910731262.8 | 10/2019 |
| CN | 111284731 A | 6/2020 |
| CN | 202010046521.6 | 6/2020 |
| GB | 2385310 | 8/2003 |
| GB | 2385310 A | 8/2003 |

* cited by examiner 3.60mm

ELECTROMAGNETIC LOCK RELEASE MECHANISM AND METHOD FOR SEPARATING SATELLITE FROM ROCKET

BACKGROUND OF THE PRESENT INVENTION

Field of Invention

The present invention relates to aerospace technology, and more particularly to an electromagnetic lock release mechanism and a method thereof for separating a satellite from a rocket.

Description of Related Arts

The satellite lock release mechanism is mainly used in the separation mechanism of the satellite and the rocket, whose main working principle is: before the rocket reaches the predetermined orbit, it realizes the reliable connection between the satellite and the rocket; after the rocket enters the orbit, a separation instruction is given, so that the satellite is released safely, namely separating the satellite from the rocket at a designed speed.

The key design elements of the satellite lock release mechanism are the mechanism form and active components. In the prior art, the mechanism form mainly adopts a separation mechanism with docking ring and belt. A main problem is: the separation mechanism with the docking ring and the belt requires the satellite to have a docking surface to which the separation mechanism is connected and installed, which cannot be applied to irregularly shaped satellites that require point positioning and locking. The active components mainly use initiators, hot knives, memory alloys, motors, etc. Main problems are: the initiators require high cost and complicated management, and provide destructive separation, which cannot be repeatedly tested on the ground; the hot knife can bear a very small load, which is difficult to fix the entire satellite, and the action time is uncertain and synchronization cannot be guaranteed; the action time of the memory alloy is also uncertain and the synchronization cannot be guaranteed; the motor needs continuous power supply, but micro-satellites are generally launched on rockets which generally cannot provide continuous current, so the motor is difficult to be applied to micro-satellites.

Therefore, there is an urgent need in the prior art for a point positioning and lock release mechanism that can be flexibly applied to micro-satellites of various configurations and can be repeatedly tested.

SUMMARY OF THE PRESENT INVENTION

Aiming at the defects of the prior art, an object of the present invention is to provide an electromagnetic lock release mechanism and a method for separating a satellite from a rocket, so as to solve the above problems.

Accordingly, in order to accomplish the above object, the present invention provides:

an electromagnetic lock release mechanism for separating a satellite from a rocket, comprising: a frame (1), an ejection unit, a satellite unit, a lock release unit, and a lock release drive unit; wherein a horizontal direction is defined as an X direction, and a vertical direction is defined as a Y direction;

the satellite unit comprises a satellite (7), a positioning pin (8), and a satellite boss (9); wherein the satellite (7) is fixed to the satellite boss (9) through the positioning pin (8);

the ejection unit is arranged below the satellite unit to provide the satellite unit with an ejection force along a positive Y direction; the ejection unit comprises an ejection spring (2), an ejection jack (3) and a spring sleeve (4); the spring sleeve (4) is fixed to the frame (1); the ejection spring (2) is arranged in the spring sleeve (4); a bottom of the ejection jack (3) is located in the spring sleeve (4) and presses against the ejection spring (2); a top of the ejection jack (3) passes through the spring sleeve (4) and extends to be in contact with a bottom surface of the satellite unit; under a locked state, the ejection spring (2) is pressed by the ejection jack (3), and the ejection spring (2) provides the satellite unit with the ejection force along the positive Y direction through the ejection jack (3); under a released state, with the ejection force of the ejection spring (2), the satellite unit moves in the positive Y direction, so as to be separated from the frame (1);

the lock release unit comprises a locking pin (10), a locking slider (11), an unlocking spring (12), and a base (13);

the base (13) is located on a left side of the satellite unit and is fixed to the frame (1); a right side of the base (13) has a first cavity; the locking pin (10) is D-shaped; a top surface of the satellite boss (9) is an inclined surface; under the locked state, the locking pin (10) is partially located in the first cavity, and a cylindrical surface of the locking pin (10) presses against the inclined surface of the satellite boss (9), thereby restricting movement of the satellite boss (9) in the positive Y direction; the inclined surface of the satellite boss (9) also provides the locking pin (10) with a contact elastic force along a normal direction of the inclined surface; the contact elastic force is decomposed into a contact elastic force in the positive Y direction and a contact elastic force in a negative X direction; the contact elastic force in the positive Y direction presses the locking pin (10) against the base (13); the contact elastic force in the negative X direction presses the locking pin (10) against the locking slider (11) behind the locking pin (10);

a left side of the base (13) has a guide groove along the Y direction, and the locking slider (11) is arranged in the guide groove to move only in the Y direction; the unlocking spring (12) is arranged between the locking slider (11) and the base (13) to provides the locking slider (11) with a thrust along the positive Y direction;

a bottom part of the locking slider (11) has a cavity along the X direction; the locking slider (11) is located behind the locking pin (10); under the locked state, a plane part at a top part of the sliding block (11) presses against a rear surface of the locking pin (10); under the released state, the unlocking spring (12) drives the locking slider (11) to move in the positive Y direction, so that the cavity of the locking slider (11) rises; under the contact elastic force in the negative X direction provided by the satellite boss (9), the locking pin (10) moves along the negative X direction and enters the cavity of the locking slider (11), so that the locking pin (10) releases a movement restriction to the satellite unit;

the lock release drive unit comprises: an electromagnet limit nut (14), an electromagnet moving core (15), and an electromagnet (16); the electromagnet (16) is fixed to the frame (1) and has a built-in coil; the electromagnet moving core (15) is arranged along the X direction; when the built-in coil of the electromagnet (16) is de-energized, a right end of the electromagnet moving core (15) presses against a top end of the locking slider (11), so as to restrict the locking slider (11) from moving in the positive Y direction; when the built-in coil of the electromagnet (16) is energized, the electromagnet moving core (15) moves in the negative X direction to release the locking slider (11), so that the unlocking spring (12) drives the locking slider (11) to move in the positive Y direction.

Preferably, the electromagnetic lock release mechanism further comprises: a limit bracket (17) which is fixedly installed above the locking slider (11), so as to restrict a moving distance of the locking slider (11) along the positive Y direction.

Preferably, the electromagnetic lock release mechanism further comprises: a pre-tensioning unit; wherein the pre-tensioning unit comprises: a pretensioner support (5) and a pretensioner (6);

the pretensioner support (5) is fixed to the frame (1); the pretensioner (6) is connected to the pretensioner support (5) by a pre-tensioning screw; the pretensioner (6) is located under the satellite boss (9); by rotating the pre-tightening screw, the pretensioner (6) is moved in the positive Y direction until a top part of the pretensioner (6) is in contact with a bottom surface of the satellite boss (9); meanwhile, during tightening of the pre-tightening screw, the pretensioner (6) pushes the satellite boss (9) to move in the positive Y direction, so that a contact between the satellite boss (9) and the locking pin (10) is elastically deformed to eliminate a contact gap.

The present invention also provides an electromagnetic lock release method based on the electromagnetic lock release mechanism for separating the satellite from the rocket, comprising steps of:

step 1, before the rocket reaches a predetermined orbit, locking the satellite with the rocket, which comprises specific steps of:

step 1.1, energizing the built-in coil of the electromagnet (16), so that the right end of the electromagnet moving core (15) presses against the top end of the locking slider (11), wherein the locking slider (11) is located at a bottom of the guide groove;

step 1.2, after the locking slider (11) is located at the bottom of the guide groove, pressing the plane part at the top part of the sliding block (11) against the rear surface of the locking pin (10) to restrict the locking pin (10) from moving along the negative X direction, so that a right end of the locking pin (10) protrudes from the first cavity of the base (13); and step 1.3, then pressing the cylindrical surface of the locking pin (10) against the inclined surface of the satellite boss (9), thereby restricting the satellite boss (9) from moving along the positive Y direction; meanwhile, driving the ejection jack (3) with the ejection spring (2) to provide the satellite unit with the ejection force along the positive Y direction, wherein the ejection force is less than a force applied by the locking pin (10) to the satellite boss (9), so as to lock the satellite unit on the frame (1) with a combination of the locking pin (10) and ejection jack (3); and step 2. after the rocket enters the predetermined orbit, giving a separation instruction to safely release the satellite, which comprises specific steps of:

step 2.1, after the rocket enters the predetermined orbit, giving the separation instruction to de-energizing the built-in coil of the electromagnet (16);

wherein when the built-in coil of the electromagnet (16) is de-energized, the electromagnet moving core (15) moves in the negative X direction, so that the right end of the electromagnet moving core (15) leaves the top end of the locking slider (11), thereby releasing the locking slider (11) in the Y direction;

step 2.2, after the electromagnet moving core (15) releases the locking slider (11) in the Y direction, driving the locking slider (11) to move in the positive Y direction with the unlocking spring (12), and using a limit bracket (17) to restrict a moving distance of the locking slider (11), so that the cavity of the locking slider (11) rises to a certain height;

step 2.3, after the cavity of the locking slider (11) rises to the certain height, releasing the locking pin (10) in the negative X direction;

wherein the locking pin (10) moves in the negative X direction due to the contact elastic force in the negative X direction provided by the inclined surface of the satellite boss (9), and partially enters the cavity of the locking slider (11), so that the locking pin (10) releases the satellite boss (9) in the positive Y direction; and step 2.4, after the locking pin (10) releases the satellite boss (9) in the positive Y direction, moving the ejection jack (3) along the positive Y direction under the ejection force of the ejection spring (2), so as to safely release the satellite by ejecting and launching the satellite unit containing the satellite boss (9) in the positive Y direction.

Advantages of the electromagnetic lock release mechanism and the method of the present invention for separating the satellite from the rocket are as follows.

The present invention is a point positioning lock release mechanism that can be used to separate micro-satellites and rockets and repeatedly tested, which provides reliable locking and separating of satellites and rockets in a complex mechanical environment, and can be repeatedly tested on the ground. The separation is entirely a mechanism action without pollution. The separation action is a continuous mechanism action, which has no impact on the satellite. The present invention reduces the cost of satellite development.

DETAILED DESCRIPTION OF THE PREFERRED EMBODIMENT

In order to make the technical problems, technical solutions and beneficial effects solved by the present invention clearer, the present invention will be further described with the accompanying drawings and embodiments. It should be understood that the specific embodiments described below are only used to explain the present invention, but not used to limit the present invention.

The present invention provides an electromagnetic lock release mechanism for separating a satellite from a rocket, which is used for locking releasing the satellite and the rocket. Such mechanism is a point positioning lock release mechanism for separating satellites and rockets and can be repeatedly tested. Normally, the mechanism is under a locked state. After a command is given, the mechanism is converted to a released state.

Figure 1:
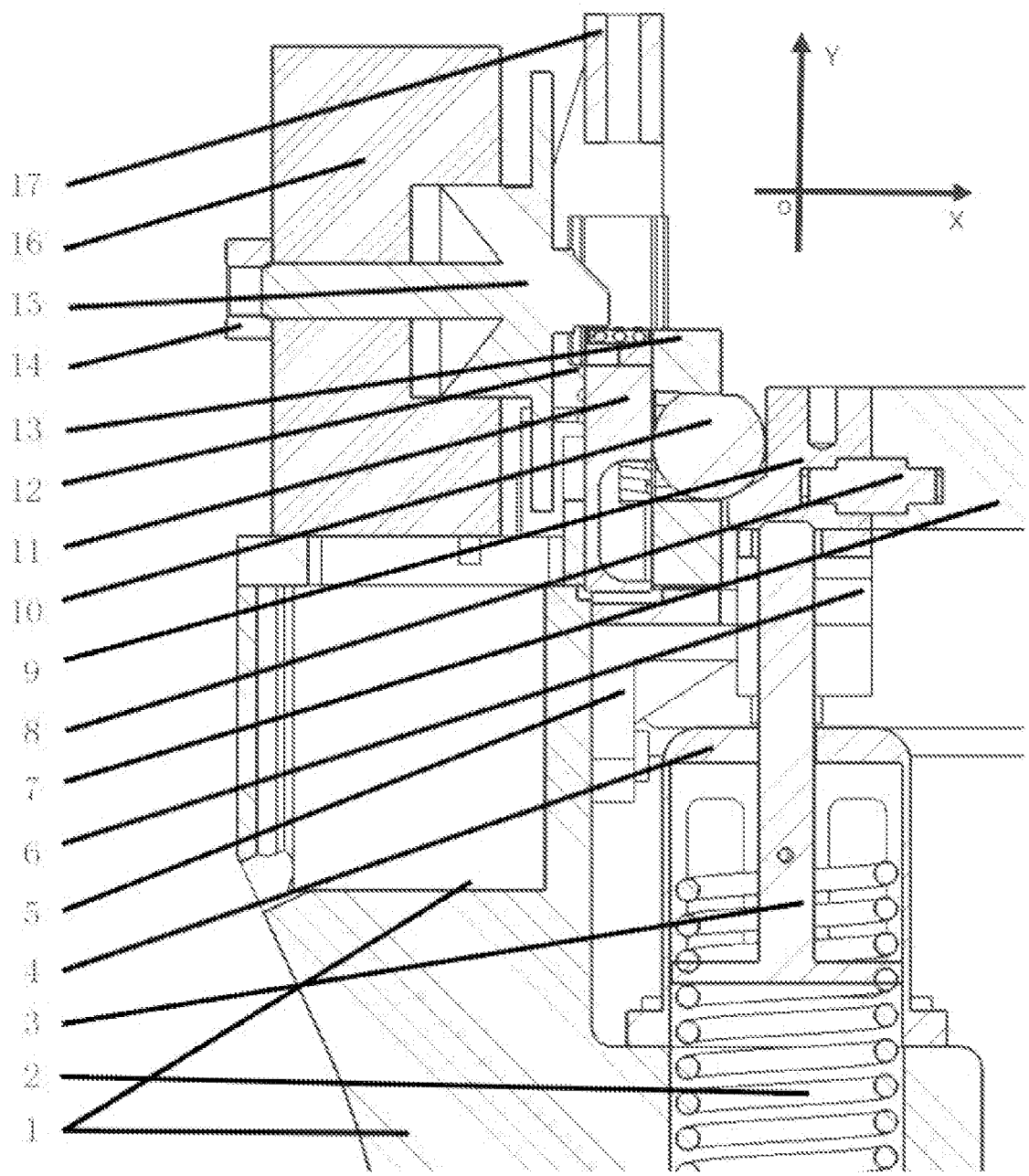
FIG. 1 is a cross-sectional view of an electromagnetic lock release mechanism for separating a satellite from a rocket under a locked state according to the present invention.
Figure 2:
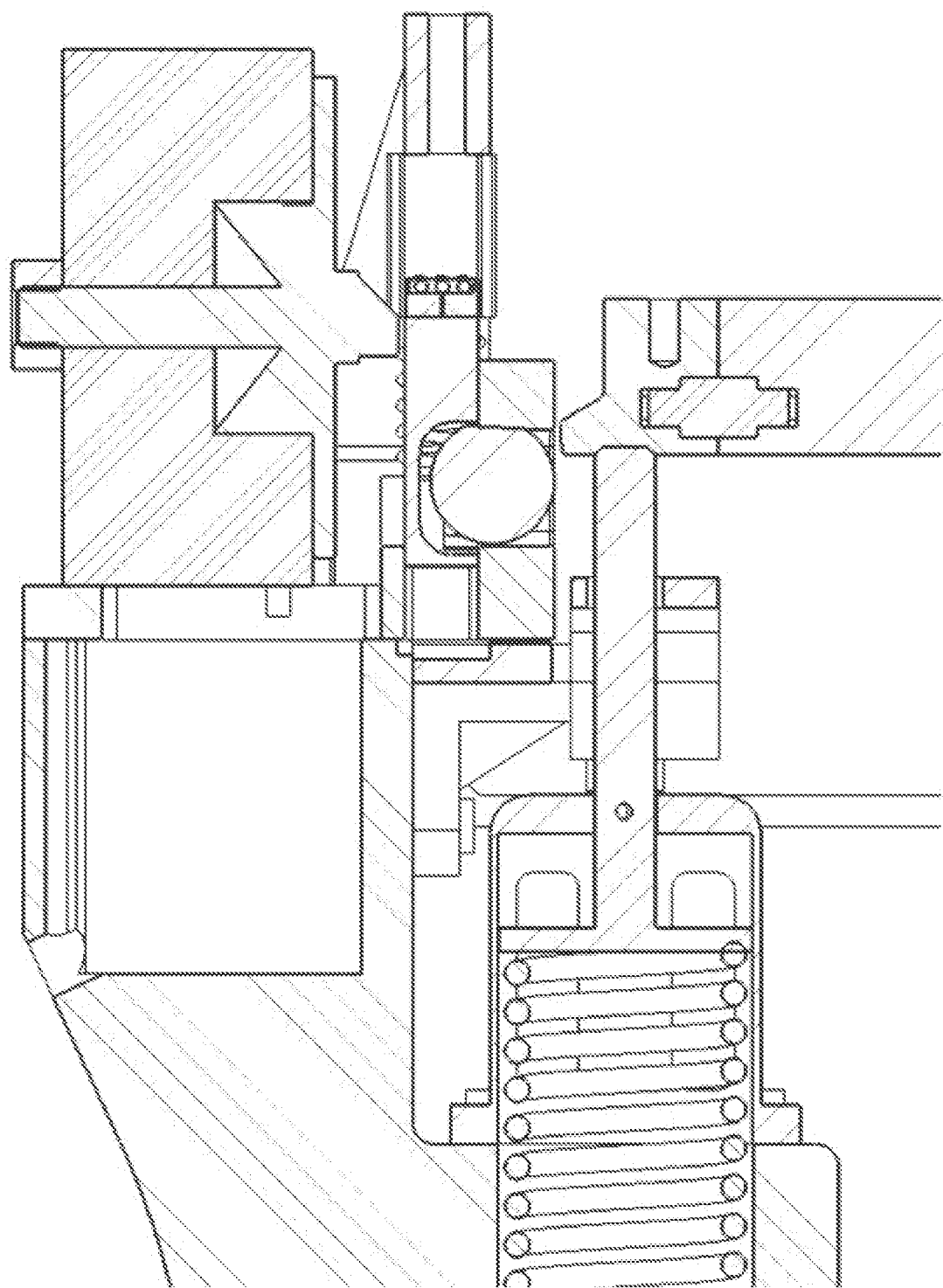
FIG. 2 is a cross-sectional view of the electromagnetic lock release mechanism under a released state according to the present invention.

Referring to FIGS. 1 and 2, the electromagnetic lock release mechanism comprises: a frame 1, an ejection unit, a satellite unit, a lock release unit, and a lock release drive unit; wherein a horizontal direction is defined as an X direction, and a vertical direction is defined as a Y direction. Each unit will be further described below.

(1) Frame

The frame is a stationary fixing part, which is fixed to the rocket for supporting. The frame changes with a shape of the satellite 7.

(2) Satellite Unit

The satellite unit comprises a satellite 7, a positioning pin 8, and a satellite boss 9; wherein the satellite 7 is fixed to the satellite boss 9 through the positioning pin 8, and interacts with the rest of the mechanism through the satellite boss 9. That is to say, to use the mechanism, it is necessary to find suitable positions on the satellite 7 to install the positioning pin 8 and the satellite boss 9. Generally, it is necessary to symmetrically install multiple sets of the positioning pins 8 and the satellite bosses 9 on a single satellite.

Therefore, the satellite 7, the positioning pin 8 and the satellite boss 9 are integrated. When the satellite is separated, the satellite unit is ejected and launched as a whole, wherein the satellite 7 is a moving part, which is a target of the lock release mechanism. The lock release mechanism has no requirement for specific form of the satellite.

(3) Ejection Unit the ejection unit is arranged below the satellite unit to provide the satellite unit with an ejection force along a positive Y direction; the ejection unit comprises an ejection spring 2, an ejection jack 3 and a spring sleeve 4; the spring sleeve 4 is fixed to the frame 1; the ejection spring 2 is arranged in the spring sleeve 4; a bottom of the ejection jack 3 is located in the spring sleeve 4 and presses against the ejection spring 2; a top of the ejection jack 3 passes through the spring sleeve 4 and extends to be in contact with a bottom surface of the satellite unit. Specifically, the ejection jack 3 is in contact with a bottom surface of the satellite boss 9.

Under the locked state, the ejection spring 2 is pressed by the ejection jack 3, wherein the ejection spring is in a compressed state, and an elastic potential energy stored after compression is an energy source for separating the satellite. Therefore, the ejection spring 2 provides the satellite unit with the ejection force along the positive Y direction through the ejection jack 3. However, under the locked state, a lock function of the lock release unit will provide the satellite unit with a force in the negative Y direction, thereby overcoming the ejection force of the ejection spring 2 and locking the satellite unit with the frame 1. Under the released state, the lock release unit releases the force on the satellite unit. Therefore, with the ejection force of the ejection spring 2, the satellite unit moves in the positive Y direction, so as to be separated from the frame 1.

(4) Lock Release Unit

The lock release unit mainly provides a lock function and a release function.

The lock function means to prevent the satellite unit from being separated from the frame 1 under the action of the ejection spring 2 and the ejection jack 3. A general principle is:

In order to realize the lock function, a top surface of the satellite boss 9 is designed as an inclined plane with an inclined angle of α. The inclined surface of the satellite boss 9 is in contact with the locking pin 10, and the locking pin 10 restricts the satellite boss 9 from moving in the positive Y direction. The locking pin 10 is D-shaped, which has a cylindrical surface contacting the inclined surface of the satellite boss 9, so that the locking pin 10 receives a contact elastic force given by the satellite boss 9 along a normal direction of the inclined surface. The contact elastic force can be decomposed into a +Y force of and a −X force, wherein the +Y force presses the locking pin 10 against the base 13, and the −X force presses the locking pin 10 against the locking slider 11. The base 13 and the frame 1 is fixed together, and the locking slider 11 is installed in the guide groove of the base 13 and can only move in the Y direction. Therefore, the locking pin 10 is stationary under the actions of the satellite boss 9, the locking slider 11, and the base 13, and the satellite boss 9 is stationary under the action of the locking pin 10 and the base 13, so as to lock the satellite.

The release function of the lock release mechanism means the locking pin 10 releases the satellite boss 9. A principle is:

When the locking slider 11 moves along the +Y direction, the cavity below the locking slider 11 will rise, and the locking pin 10 will detach from the locking slider 11. At this time, the locking pin 10 will move in the −X direction under the contact force in the −X direction given by the satellite boss 9 and enter the cavity of the locking slider 11. The satellite boss 9 will no longer be restricted and moves along the +Y direction under the action of the ejection spring 2 and the ejection jack 3, so as to realize separation.

A method for controlling the lock release movement is as follows:

A specific structure is as follows: the lock release unit comprises a locking pin 10, a locking slider 11, an unlocking spring 12, and a base 13.

The base 13 is located on a left side of the satellite unit and is fixed to the frame 1; a right side of the base 13 has a first cavity; the locking pin 10 is D-shaped; a top surface of the satellite boss 9 is an inclined surface; under the locked state, the locking pin 10 is partially located in the first cavity, and a cylindrical surface of the locking pin 10 presses against the inclined surface of the satellite boss 9, thereby restricting movement of the satellite boss 9 in the positive Y direction; the inclined surface of the satellite boss 9 also provides the locking pin 10 with a contact elastic force along a normal direction of the inclined surface; the contact elastic force is decomposed into a contact elastic force in the positive Y direction and a contact elastic force in a negative X direction; the contact elastic force in the positive Y direction presses the locking pin 10 against the base 13; the contact elastic force in the negative X direction presses the locking pin 10 against the locking slider 11 behind the locking pin 10.

A left side of the base 13 has a guide groove along the Y direction, and the locking slider 11 is arranged in the guide groove to move only in the Y direction; the unlocking spring 12 is arranged between the locking slider 11 and the base 13 to provides the locking slider 11 with a thrust along the positive Y direction; under the locked state, the unlocking spring is compressed.

The electromagnetic lock release mechanism further comprises: a limit bracket 17 which is fixedly installed above the locking slider 11, so as to restrict a moving distance of the locking slider 11 along the positive Y direction.

a bottom part of the locking slider 11 has a cavity along the X direction; the locking slider 11 is located behind the locking pin 10; under the locked state, a plane part at a top part of the sliding block 11 presses against a rear surface of the locking pin 10; under the released state, the unlocking spring 12 drives the locking slider 11 to move in the positive Y direction, so that the cavity of the locking slider 11 rises; under the contact elastic force in the negative X direction provided by the satellite boss 9, the locking pin 10 moves along the negative X direction and enters the cavity of the locking slider 11, so that the locking pin 10 releases a movement restriction to the satellite unit.

(5) Lock Release Drive Unit

The key of the locking process and the releasing process is the movement of the locking slider 11 in the +Y direction. The unlocking spring 12 is installed between the locking slider 11 and the base 13. The unlocking spring 12 is in a compressed state and can push the locking slider 11 to move along the +Y direction. However, the top surface of the locking slider 11 is in contact with the electromagnet moving core 15, and the electromagnet moving core 15 can only move along the X direction. Therefore, only when the electromagnet moving core 15 has moved along the −X direction for a period of time and is no longer in contact with the locking slider 11, the locking slider 11 can move. The electromagnet moving core 15 and the electromagnet 16 are matched with a shaft hole, and a return spring is installed between the electromagnet moving core 15 and the electromagnet 16. The return spring is a compression spring, which provides the electromagnet moving core 15 with an elastic force along the +X direction. When a separation signal is given, the electromagnet 16 is energized, and an electromagnetic force generated by the electromagnet 16 will attract the electromagnet moving core 15, so that the electromagnet moving core 15 overcomes the elastic force of the return spring and move along the −X direction, thereby releasing the locking slider 11. The unlocking spring 12 moves the locking slider 11 along the +Y direction to release the locking pin 10, and then the satellite boss 9 moves the locking pin 10 along the −X direction. When the satellite boss 9 completely pushes the locking pin 10 away, the separation can be completed. In order to ensure that the locking pin 10 can enter the cavity of the locking slider 11 after the locking slider 11 moves, the limit bracket 17 is used to limit the moving distance of the locking slider 11.

A specific structure is as follows:

the lock release drive unit comprises: an electromagnet limit nut 14, an electromagnet moving core 15, and an electromagnet 16;

the electromagnet 16 is fixed to the frame 1 and has a built-in coil; the electromagnet moving core 15 is arranged along the X direction; when the built-in coil of the electromagnet 16 is de-energized, a right end of the electromagnet moving core 15 presses against a top end of the locking slider 11, so as to restrict the locking slider 11 from moving in the positive Y direction; when the built-in coil of the electromagnet 16 is energized, the electromagnet moving core 15 moves in the negative X direction to release the locking slider 11, so that the unlocking spring 12 drives the locking slider 11 to move in the positive Y direction.

(6) Pre-Tensioning Unit

A pre-tensioning method: during rocket launch process, the entire mechanism faces a harsh mechanical environment, including vibration, shock, and overload. In order to prevent gaps in the mechanism during launch and to eliminate assembly errors and deviations caused by vibration, the pre-tightening unit is designed.

The pre-tensioning unit comprises: a pretensioner support 5 and a pretensioner 6;

the pretensioner support 5 is fixed to the frame 1; the pretensioner 6 is connected to the pretensioner support 5 by a pre-tensioning screw; the pretensioner 6 is located under the satellite boss 9; by rotating the pre-tightening screw, the pretensioner 6 is moved in the positive Y direction until a top part of the pretensioner 6 is in contact with a bottom surface of the satellite boss 9; meanwhile, during tightening of the pre-tightening screw, the pretensioner 6 pushes the satellite boss 9 to move in the positive Y direction, so that a contact between the satellite boss 9 and the locking pin 10 is elastically deformed to eliminate a contact gap; the pretensioner 6 also works with the ejection jack 3 to provide an initial separation force after the mechanism is released.

The present invention also provides an electromagnetic lock release method for separating the satellite from the rocket, comprising steps of:

step 1, before the rocket reaches a predetermined orbit, locking the satellite with the rocket, which comprises specific steps of:

step 1.1, energizing the built-in coil of the electromagnet 16, so that the right end of the electromagnet moving core 15 presses against the top end of the locking slider 11, wherein the locking slider 11 is located at a bottom of the guide groove;

step 1.2, after the locking slider 11 is located at the bottom of the guide groove, pressing the plane part at the top part of the sliding block 11 against the rear surface of the locking pin 10 to restrict the locking pin 10 from moving along the negative X direction, so that a right end of the locking pin 10 protrudes from the first cavity of the base 13; and step 1.3, then pressing the cylindrical surface of the locking pin 10 against the inclined surface of the satellite boss 9, thereby restricting the satellite boss 9 from moving along the positive Y direction; meanwhile, driving the ejection jack 3 with the ejection spring 2 to provide the satellite unit with the ejection force along the positive Y direction, wherein the ejection force is less than a force applied by the locking pin 10 to the satellite boss 9, so as to lock the satellite unit on the frame 1 with a combination of the locking pin 10 and ejection jack 3; and step 2. after the rocket enters the predetermined orbit, giving a separation instruction to safely release the satellite, which comprises specific steps of:

step 2.1, after the rocket enters the predetermined orbit, giving the separation instruction to de-energizing the built-in coil of the electromagnet 16;

wherein when the built-in coil of the electromagnet 16 is de-energized, the electromagnet moving core 15 moves in the negative X direction, so that the right end of the electromagnet moving core 15 leaves the top end of the locking slider 11, thereby releasing the locking slider 11 in the Y direction;

step 2.2, after the electromagnet moving core 15 releases the locking slider 11 in the Y direction, driving the locking slider 11 to move in the positive Y direction with the unlocking spring 12, and using a limit bracket 17 to restrict a moving distance of the locking slider 11, so that the cavity of the locking slider 11 rises to a certain height;

step 2.3, after the cavity of the locking slider 11 rises to the certain height, releasing the locking pin 10 in the negative X direction;

wherein the locking pin 10 moves in the negative X direction due to the contact elastic force in the negative X direction provided by the inclined surface of the satellite boss 9, and partially enters the cavity of the locking slider 11, so that the locking pin 10 releases the satellite boss 9 in the positive Y direction; and step 2.4, after the locking pin 10 releases the satellite boss 9 in the positive Y direction, moving the ejection jack 3 along the positive Y direction under the ejection force of the ejection spring 2, so as to safely release the satellite by ejecting and launching the satellite unit containing the satellite boss 9 in the positive Y direction.

Requirements for each process:

The mechanism has strict requirements on materials of each component. On the one hand, materials that relatively move generally have hardness requirements. On the other hand, due to the aerospace vacuum environment, the materials that relatively move should not use the same kind of metal to prevent cold welding.

Frame 1: aluminum alloy is generally used, and conductive oxidation treatment is necessary.

Ejection jack 3: the same material as the spring sleeve 4 and satellite boss 9 cannot be used, and the hardness should be greater than 1.

Pretensioner support 5 and pretensioner 6: materials with high strength are used, such as stainless steel, titanium alloy, but the same material as the satellite boss 9 cannot be used.

Satellite boss 9: the surface needs to be polished.

Locking pin 10: the hardness must be greater than those of all other parts; the surface must be polished, and can be plated with molybdenum disulfide; the same material as the satellite boss 9 and the base 13 cannot be used.

Locking slider 11: the same material as the locking pin 10 and the base 13 cannot be used.

Electromagnet moving core 15: an iron material is necessary, and a load-bearing part is made of stainless steel; a gap between the electromagnet 16 during assembly must be strictly controlled within ±0.3 mm of a designed value.

Electromagnet 16: parameters of the built-in coil need to be calculated according to the load.

Figure 3:
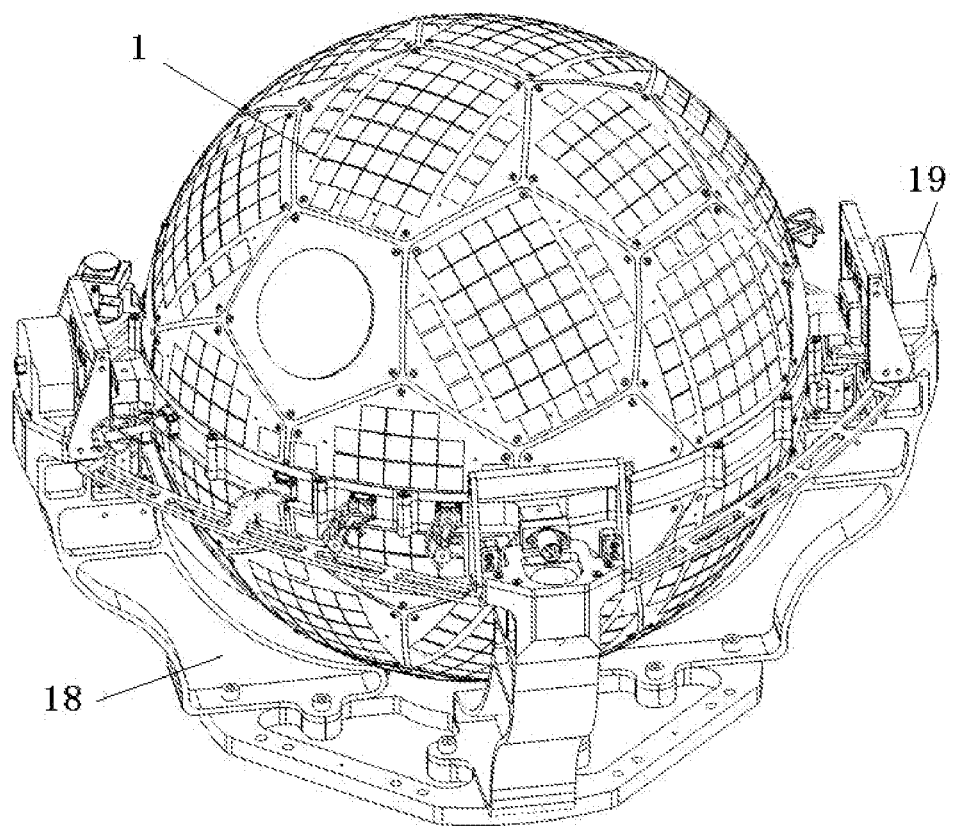
FIG. 3 is an assembly diagram of the electromagnetic lock release mechanism according to the present invention.

FIG. 3 shows an embodiment of the mechanism, wherein the frame fixed to the rocket is labeled as 1, the lock release mechanism of the present invention is labeled as 18, and a spherical satellite is labeled as 19. The spherical satellite is connected to the frame 1 through two sets of symmetrical lock release mechanisms, so as to lock and release the satellite and the rocket. When an instruction is given, the two sets of lock release mechanisms act at the same time to separate the satellite from the rocket.

According to the embodiment, a mass of the satellite is 22 kg, a spherical diameter is 550 mm, and a total weight of the frame and the lock release mechanism is 15 kg.

Key Design Parameters

An inclined plane angle α of the satellite boss 9 is 30°, the ejection spring 2 has a force of 200N, the unlocking spring 12 has a force of 100N, and the electromagnet return spring has a force of 40N. The electromagnet moving core 15 has a power of 100 W. The frame 1 is made of 2A12 aluminum alloy, the ejector jack 3 is made of 1Cr18 stainless steel, the spring sleeve 4 is made of 2A12 aluminum alloy, the pretensioner support 5 and the pretensioner 6 are made of 1Cr18 stainless steel, the positioning pin 8 and the satellite boss 9 are made of TC4, the locking pin 10 is made of 9Cr18 stainless steel (quenched), the locking slider 11 is made of TC4, the base 13 is made of 1Cr18 stainless steel, and the limit bracket 17 is made of 2A12 aluminum alloy. A diameter of the locking pin 10 is 16 mm, a moving distance of the locking slider 11 is 2 mm, and a moving distance of the electromagnet 16 is 4 mm.

According to the embodiment, a separation speed of the satellite is 0.8 m/s. Mechanical environment adaptability is shown in Table 1 to Table 3. A separation action time is about 40 ms. The mechanism can be repeatedly tested on the ground.

TABLE 1

Low-frequency sine sweep test magnitude

| Longitudinal | | Transverse | |
| --- | --- | --- | --- |
| Frequency (Hz) | Amplitude | Frequency (Hz) | Amplitude |
| 5-8 | 3.91 mm | 5-8 | 3.91 mm |
| 8-30 | 1.0 g | 8-30 | 1.0 g |
| 30-60 | 2.0 g | 30-100 | 1.5 g |
| 60-100 | 1.8 g | | |

TABLE 2

Impact environmental conditions

| Frequency range (Hz) | Acceleration shock response spectrum (Q = 10) |
| --- | --- |
| 100-1500 | +9 dB/oct |
| 1500-5000 | 2800 g |

TABLE 3

Random vibration test magnitude

| | | Acceptance test | |
| --- | --- | --- | --- |
| Name | Frequency range (Hz) | Power spectral density (g2/Hz) | Total root mean square acceleration (g) |
| Magnitude | 20-150 | +3 dB/oct | 7.19 |
| | 150-280 | 0.04 | |
| | 280-320 | 0.15 | |
| | 320-380 | 0.10 | |
| | 380-850 | 0.05 | |
| | 850-1000 | 0.02 | |
| | 1000-2000 | 0.005 | |
| Test direction | axial, radial and tangential | | |
| Test time | 1 min for each direction | | |

Assembly Steps

Figure 4:
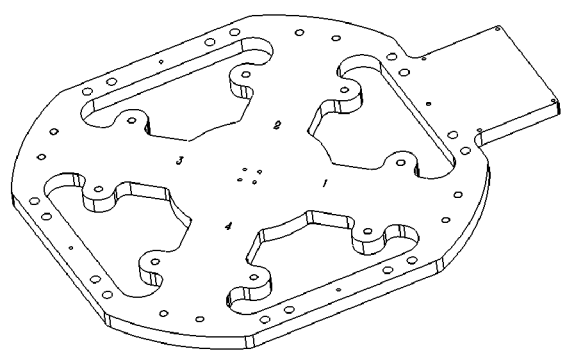
FIG. 4 is a sketch view of a bottom plate.

Step 1, placing a bottom plate as an assembly reference, wherein FIG. 4 is a sketch view of the bottom plate.

Figure 5:
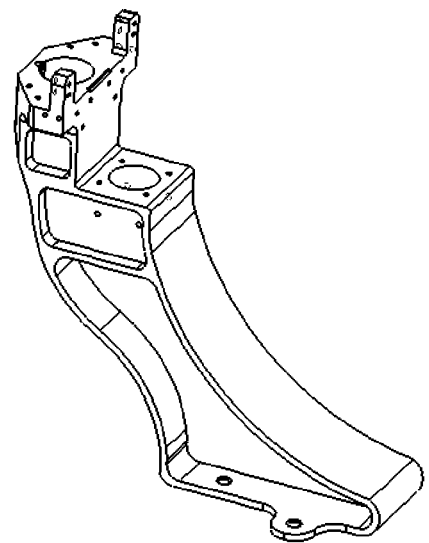
FIG. 5 is a sketch view of a support arm.
Figure 6:
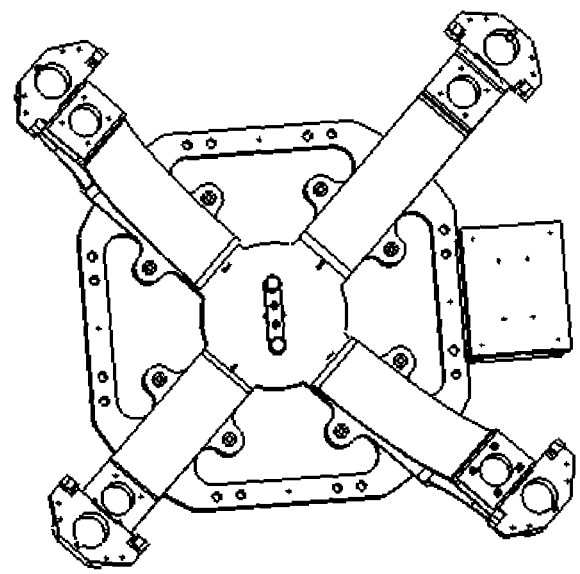
FIG. 6 is an assembly diagram of the support arm and the bottom plate.

Step 2, installing support arms on the bottom plate, wherein each support arm is fixed by 4 M8×16 hexagon socket titanium screws which are pre-tightened according to a standard torque; FIG. 5 is a sketch view of the support arm and FIG. 6 is an assembly diagram of the support arm and the bottom plate.

Figure 7:
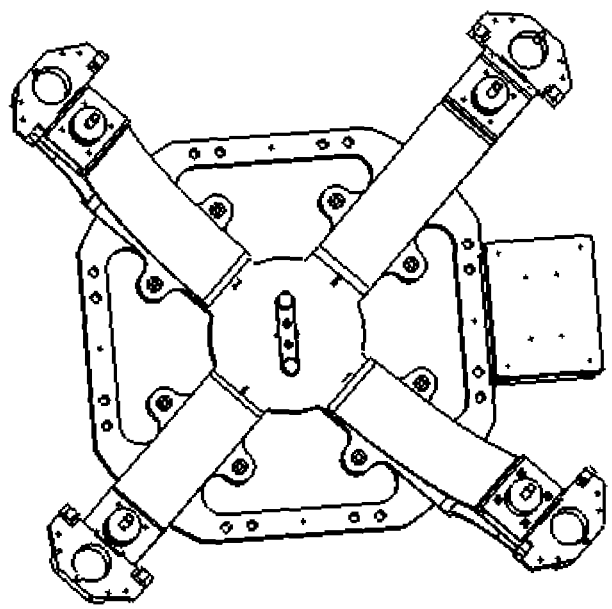
FIG. 7 is a structural diagram formed after an assembling step 3.

Step 3, putting 4 ejection springs into round holes of the 4 support arms respectively; and placing a spring jack concentrically above the ejection spring, as shown in FIG. 7.

Figure 8:
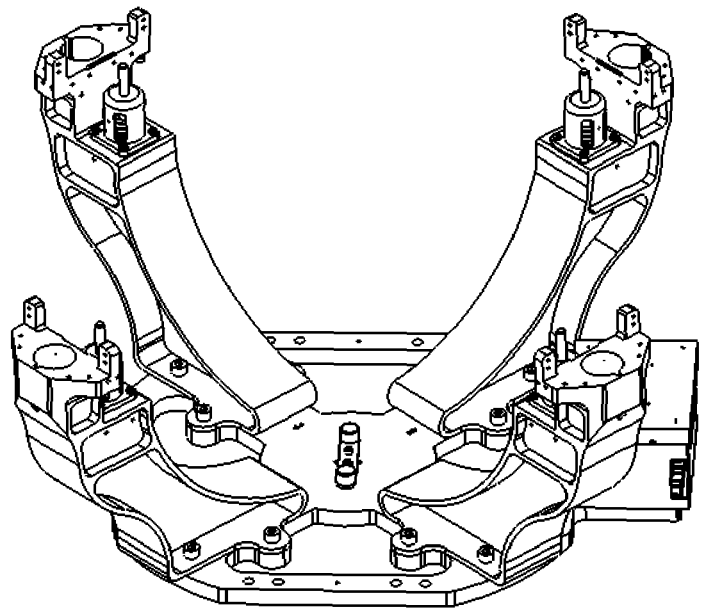
FIG. 8 is a structural diagram formed after an assembling step 4.

Step 4, putting a spring sleeve on a top of the spring jack, fixing each spring sleeve with 4 M4×10 hexagon socket titanium screws while paying attention to a direction of the spring sleeve, as shown in FIG. 8.

Figure 9:
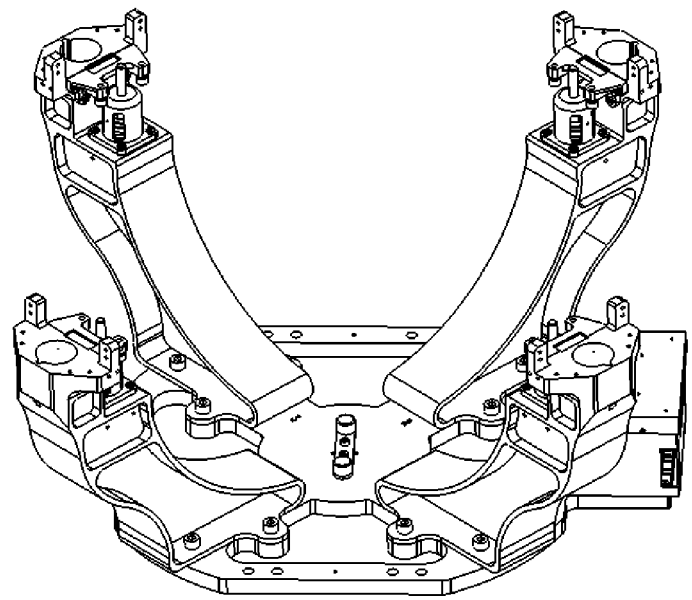
FIG. 9 is a structural diagram formed after an assembling step 5.

Step 5, installing 4 pretensioner supports on the 4 support arms, and fixing each part by 4 M4×10 hexagon socket titanium screws; wherein a theoretical requirement of a single screw pre-tightening force is 2475N, which is converted into a torque wrench with a torque of about 1.88 Nm; it should be noted that a parallelism between a top surface of the pretensioner support and a top surface of the support arm during installation is required be 0.1 mm, as shown in FIG. 9.

Figure 10:
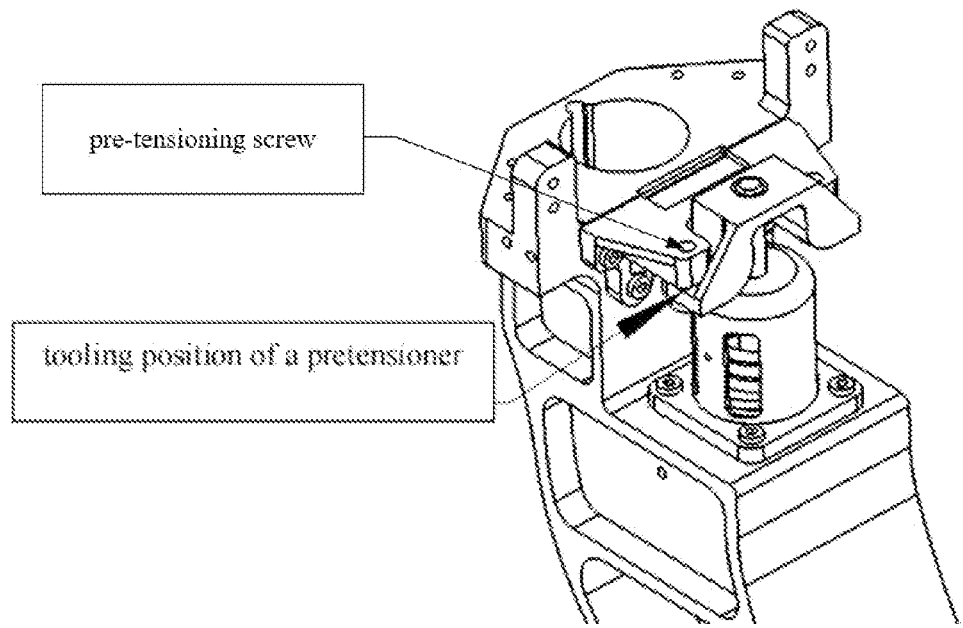
FIG. 10 illustrates a tooling position of a pretensioner.
Figure 11:
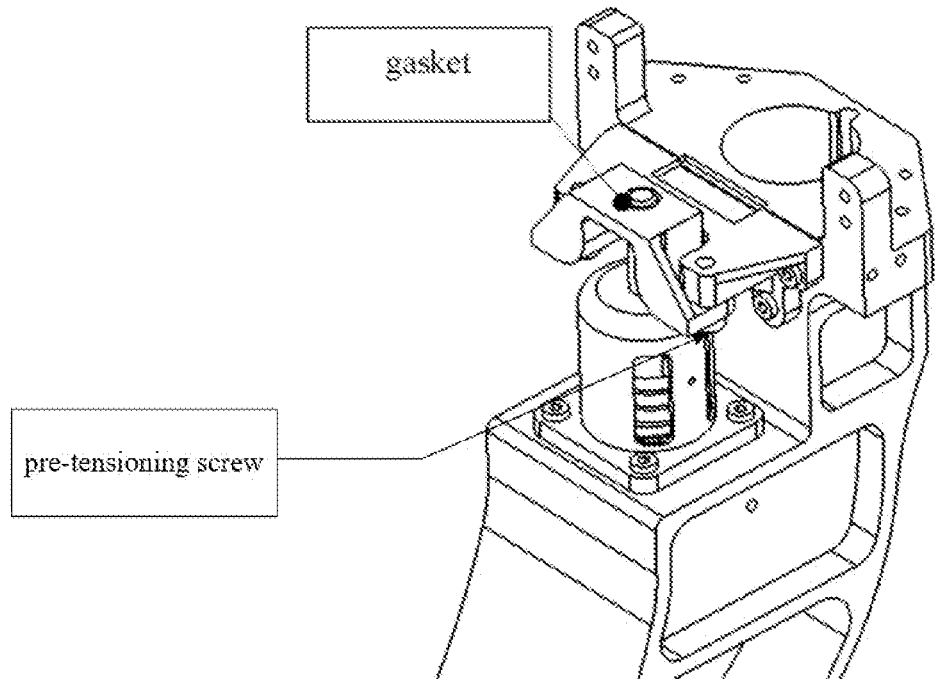
FIG. 11 illustrates a position of a gasket.
Figure 12:
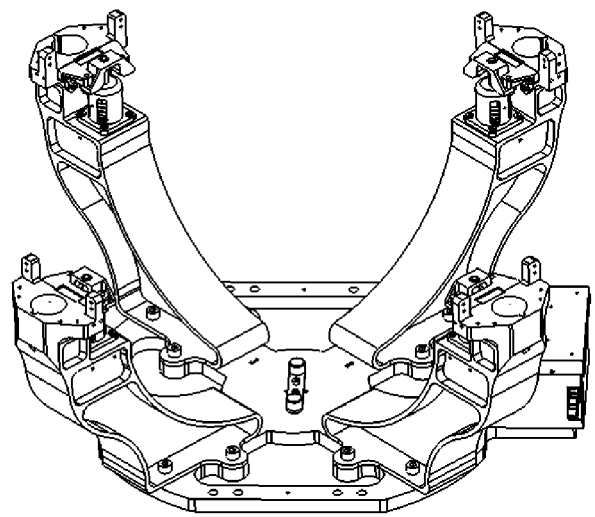
FIG. 12 is a structural diagram formed after an assembling step 6.

Step 6, placing pretensioners, and connecting one pretensioner to one pretensioner support by two M6×12 hexagon socket titanium alloy screws; during installation, using a 0.5 mm-thick tooling to keep two surface intervals at two screwed positions are both 0.5 mm, wherein the screws need to be adjusted later, and there is no need to apply pre-tightening torque in this process; pasting a 0.6 mm-thick gasket on a top surface of the pretensioner in the first and third quadrants, as shown in FIG. 12; wherein FIG. 10 illustrates a tooling position of a pretensioner and FIG. 11 illustrates a position of a gasket.

Figure 13:
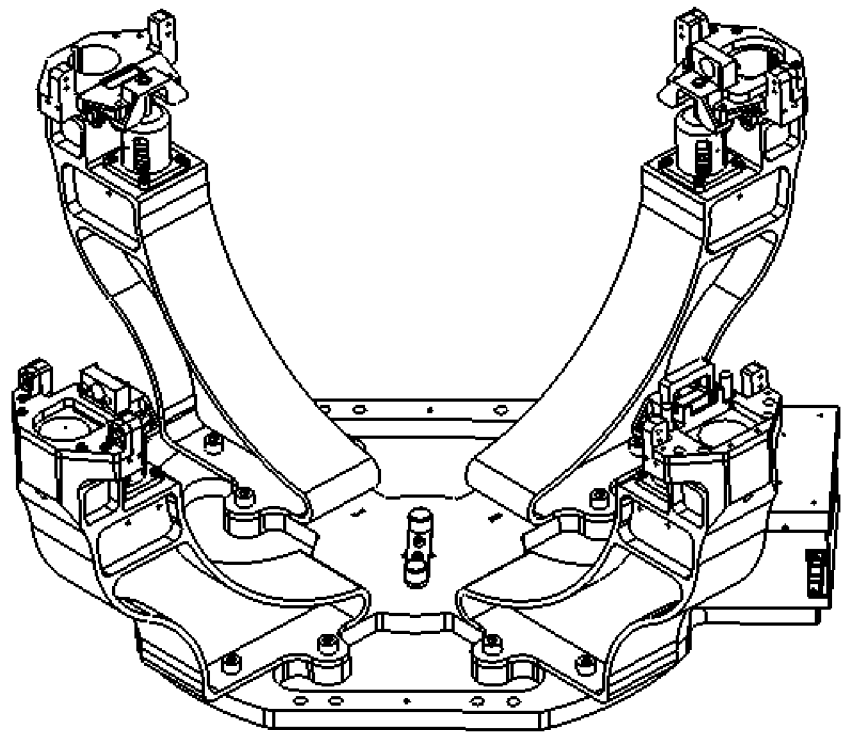
FIG. 13 is a structural diagram formed after an assembling step 7.

Step 7, installing a travel switch limit base and an electromagnetic lock release base, wherein the travel switch limit base is located in the first and third quadrants, and the electromagnetic lock release base is located in the second and fourth quadrants; each base is connected to the support arm by 4 horizontal and 4 vertical M4×10 hexagon socket titanium screws; the fixing screws of the electromagnetic lock release base need to be tightened and installed according to the standard torque; the screws of the travel switch limit base do not need to be tightened, and is adjusted during subsequent process, as shown in FIG. 13.

Figure 14:
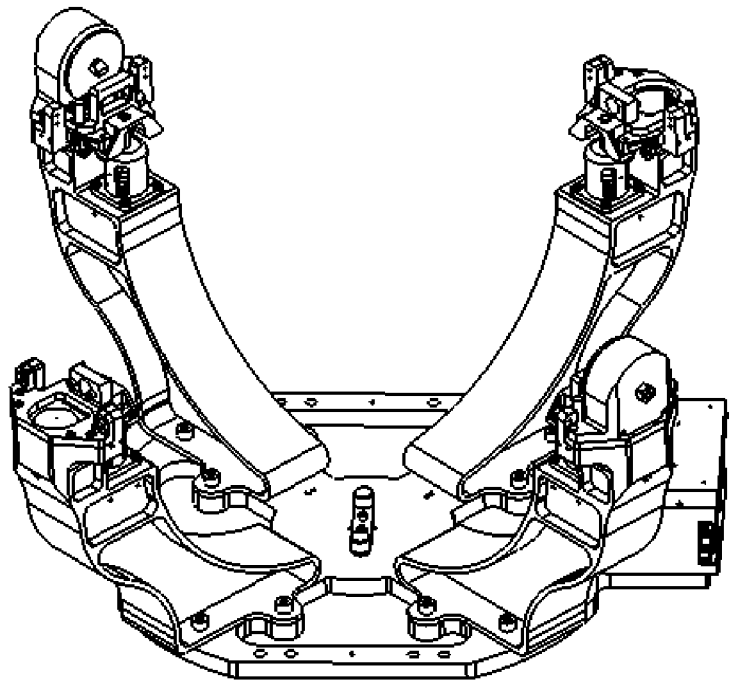
FIG. 14 is a structural diagram formed after an assembling step 8.

Step 8, installing two electromagnets, and routing wires through the holes of the support arms; wherein each electro-permanent magnet is connected to the base by 4 M4×10 hexagon socket titanium screws; surfaces of the electromagnets must be clean; during installing, the electromagnet should be as close as possible to an inside of a separation mechanism, as shown in FIG. 14.

Figure 15:
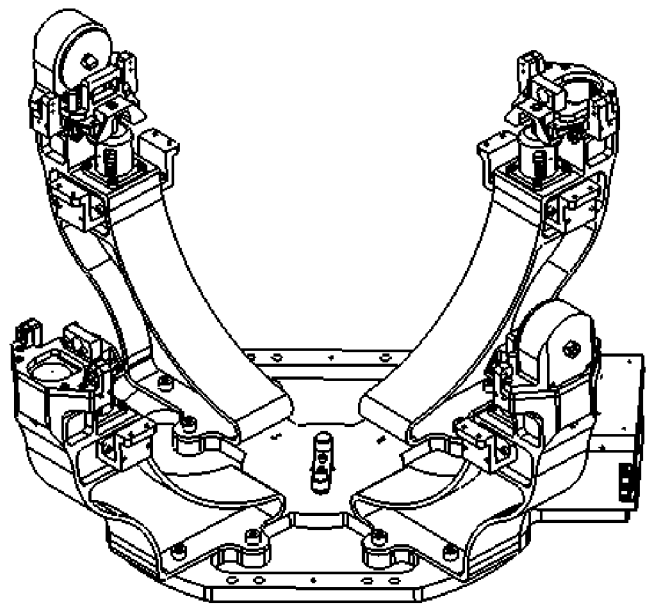
FIG. 15 is a structural diagram formed after an assembling step 9.

Step 9, installing a spring compression tooling on each side of each support arm, wherein each mounting block is connected to the support arm with M4×16 hexagon socket screws, as shown in FIG. 15.

Figure 16:
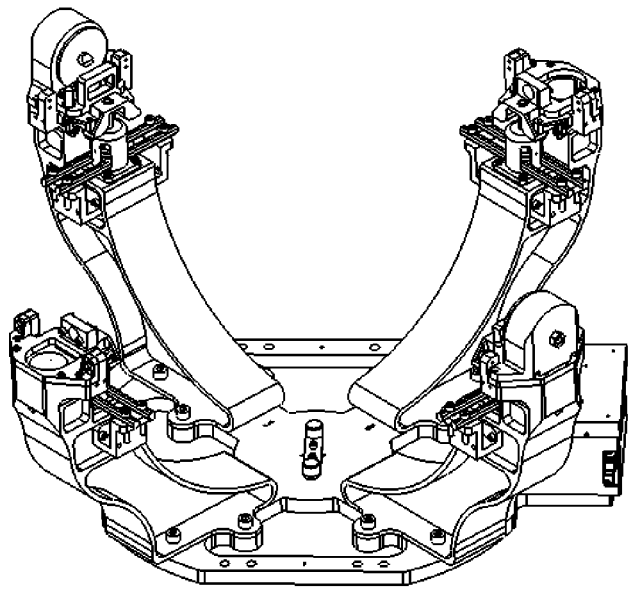
FIG. 16 is a structural diagram formed after an assembling step 10.

Step 10, compressing the ejection springs one by one; first pressing down the ejection spring with a tool, and then inserting a spring pressure bar through the spring sleeve; wherein both ends of each spring pressure bar pass through the M5×30 hexagon socket screws and are screwed into the mounting block installed in the previous step, and then bolts are screwed in so that a highest point of the spring jack is lower than a top surface of the pretensioner, as shown in FIG. 16.

Figure 17:
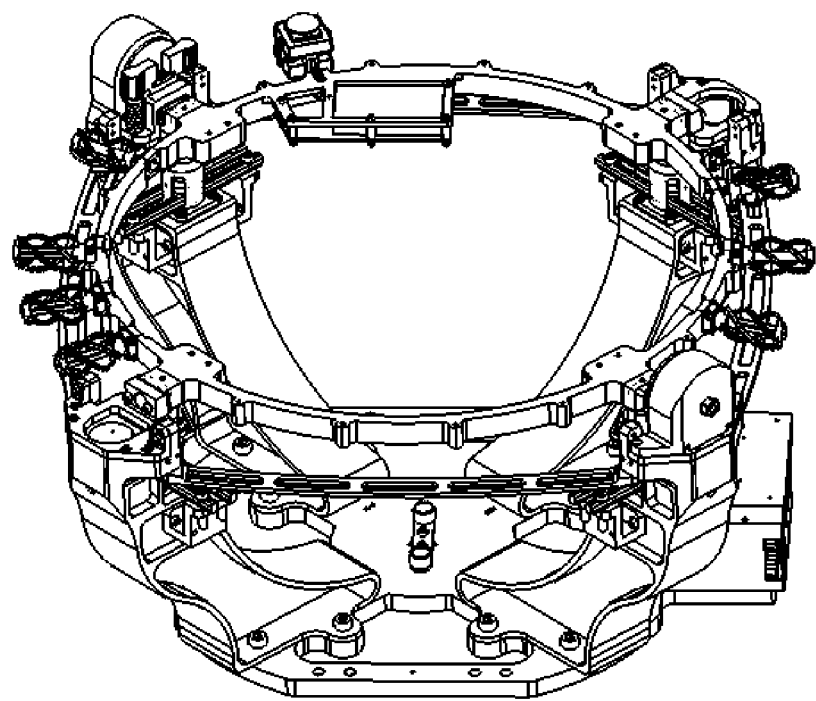
FIG. 17 is a structural diagram formed after an assembling step 11.

Step 11, first placing a backup center bearing ring, then removing the backup center bearing ring if there is no problem and placing the satellite; wherein a bottom travel switch of the satellite is in contact with a bottom pressing surface of the separation mechanism; a panoramic camera of the satellite and a grounding hole of the bottom plate of the separation mechanism are in opposite quadrants, as shown in FIG. 17.

Figure 18:
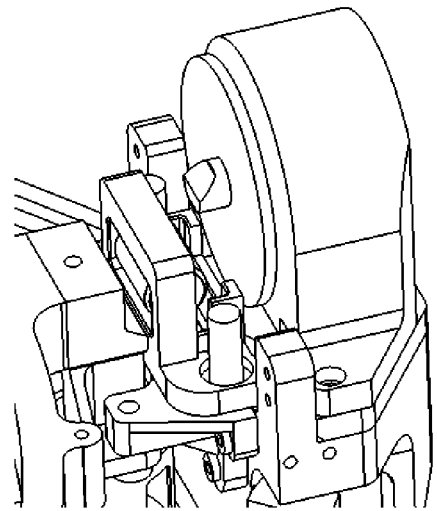
FIG. 18 is a structural diagram formed after an assembling step 12.

Step 12, placing the locking pin after applying grease; wherein a plane of the locking pin fits a plane of the base, and the locking pin can only be put in from one side of the base, as shown in FIG. 18.

Figure 19:
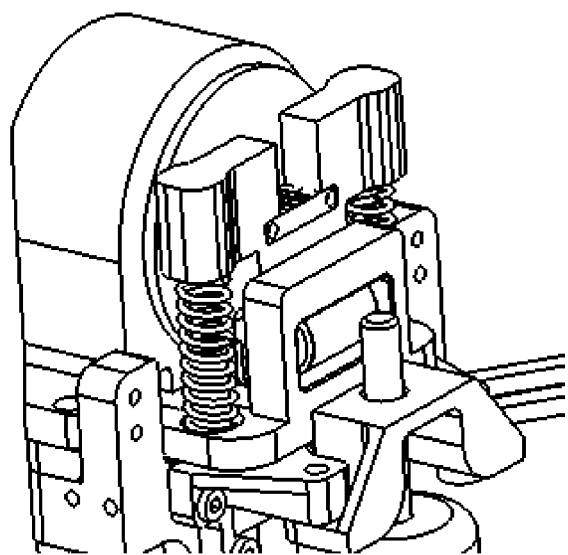
FIG. 19 is a structural diagram formed after an assembling step 13.
Figure 20:
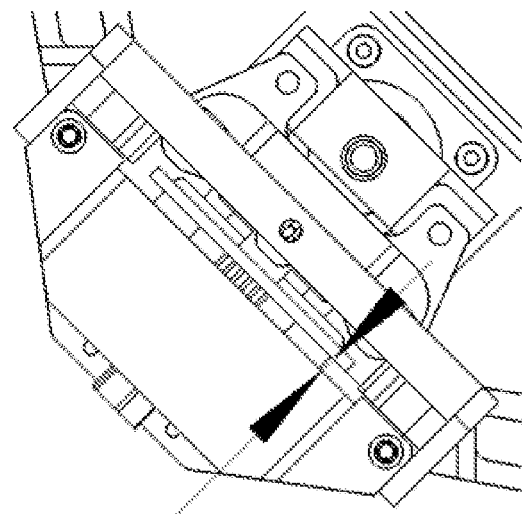
FIG. 20 illustrates spacing control.

Step 13, installing the locking sliders on both sides after applying grease; first pressing the electromagnet moving core to make room for the locking slider, then inserting an unlocking spring between the locking slider and the lock release base (each has a positioning rod, the spring is not shown in the figure), and then pressing and holding the locking slider, and rotating the electromagnet moving core so that the electromagnet moving core enters a waist hole of the locking slider; confirming that a limit nut of the electromagnet fits an electromagnet shell to complete installation; wherein in this step, a distance between a moving core baffle and the electromagnet shell needs to be measured, which is required to be 3.6-3.8 mm; such distance can be controlled by adding or subtracting a 0.1 mm spacer between the limit nut at a tail end of the electromagnet moving core and the electromagnet shell; a measurement position is where a diameter of a electromagnet disc is symmetrical in a horizontal direction, and two measured values are averaged, as shown in FIG. 19, wherein FIG. 20 illustrates spacing control.

Figure 21:
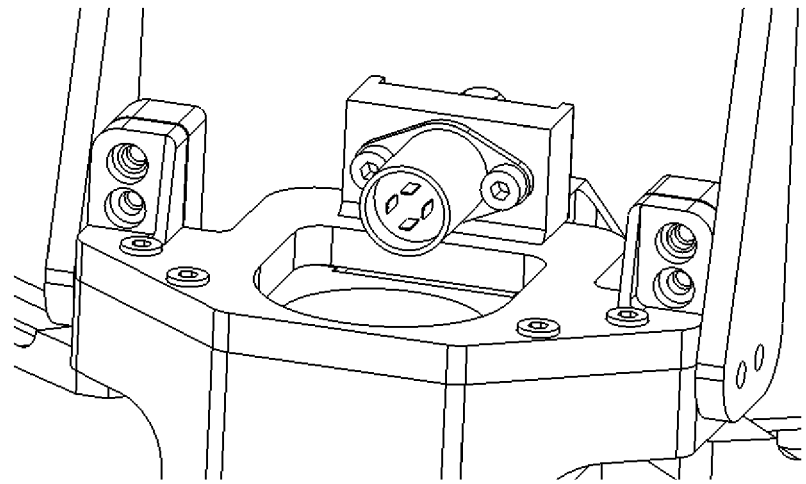
FIG. 21 is a structural diagram formed after an assembling step 14.

Step 14, installing 2 KX-1 travel switches and routing wires through the holes of the support arms, wherein each travel switch is connected to the travel switch limit base through two M4×10 hexagonal socket titanium screws; after tightening screws between the travel switch and the travel switch limit base, adjusting a position of the travel switch limit base, testing a travel switch signal, and confirming that compression of the travel switch is correct; and then tightening the 8 M4 screws connecting the travel switch limit base and the support arm, as shown in FIG. 21.

Figure 22:
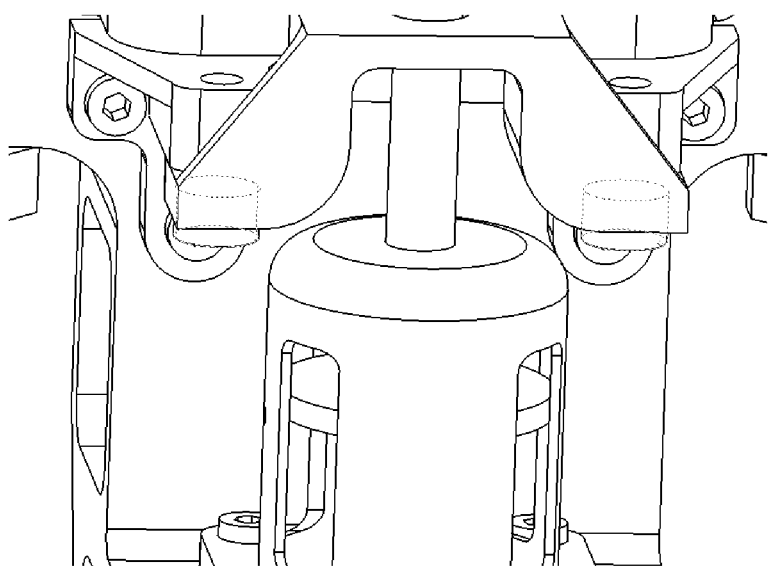
FIG. 22 is a structural diagram formed after an assembling step 15.
Figure 23:
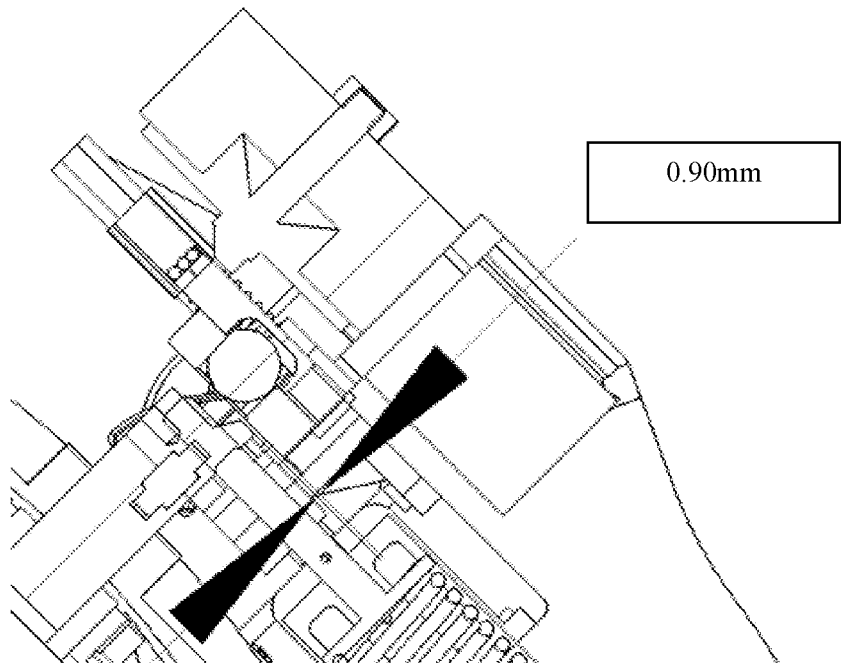
FIG. 23 is a sketch view when a distance between an outermost side of the satellite and an innermost side of a base is 0.9 mm.
Figure 24:
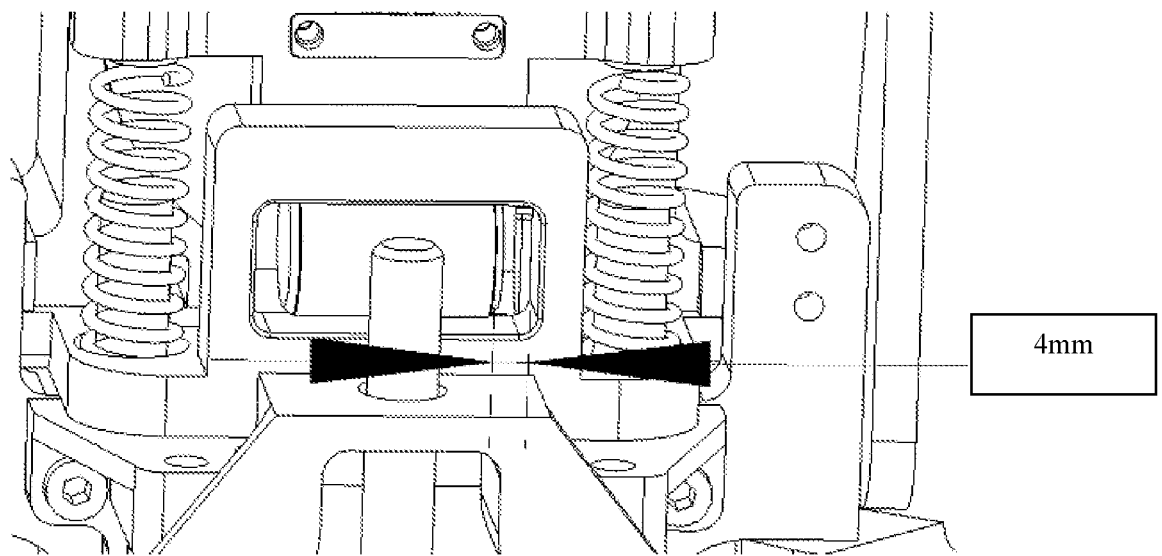
FIG. 24 is a sketch view when a distance between a pin side surface and a base groove internal wall is 6 mm.

Step 15, adjusting the satellite and the locking pin, and applying a pre-tightening force; removing the 0.5 mm-thick tooling between the pretensioner on both sides of the lock release base and the pretensioner supporting, and tightening 8 M6 screws of the 4 pretensioners; wherein symmetrical screws need to be synchronized as much as possible during applying the pre-tightening force; during tightening, positions of the locking pin and the satellite need to be adjusted; the locking pin should be placed in a center as far as possible; a unilateral distance between a pin side surface and a base groove internal wall should be controlled at 6±0.5 mm; a distance between a outermost side of the satellite and an innermost surface of the base should be controlled at 0.9±0.2 mm, as shown in FIG. 22; wherein FIG. 23 is a sketch view when a distance between an outermost side of the satellite and an innermost side of a base is 0.9 mm; and FIG. 24 is a sketch view when a distance between a pin side surface and a base groove internal wall is 6 mm.

Step 16, installing 4 stiffeners, wherein each stiffener is connected to two adjacent support arms.

Step 17, removing the spring compression tooling installed in the steps 9 and 10, so that the spring jack presses against the satellite; checking whether the spring jack is tilted, meanwhile measuring a ground resistance between the satellite and the separation mechanism.

Step 18, applying a pre-tightening force to the pre-tightening parts in the first and third quadrants, and tightening the M6 screws.

Step 19, installing 2 limit brackets, wherein each limit bracket is connected to the support arm by 4 M4×10 hexagon socket titanium screws.

Step 20, completing the assembly, as shown in FIG. 3.

According to the present invention, the electromagnetic lock release mechanism and the method thereof for separating the satellite from the rocket have advantages as follows.

(1) Reliable Locking:

Under reasonable parameter design, the satellite and the rocket can be reliably locked together even in a complex mechanical environment, which has been verified by mechanical tests. The test items are overload, sinusoidal vibration, random vibration, shock, etc.

(2) After a release command is given, the satellite and the rocket can be reliably separated, and the separation speed can be effectively controlled by adjusting the design parameters of the spring. The separation speed can be measured with a high-speed camera.

(3) The separation test can be repeated on the ground without causing damage to the mechanism, which means the original parts can be used to rebuild the assembly after the separation is completed.

(4) The separation is entirely a mechanism action, and there is no pollution, which means only the satellite is separated from the rocket.

(5) The separation action is a continuous mechanism action, which has no impact on the satellite. Impact response of the satellite can be tested through sensors.

(6) The cost of satellite development is greatly reduced. Compared with the conventional initiator lock release mechanism, a single group of mechanism can save about 200,000 RMB in economic costs.

The above is only the preferred embodiment of the present invention. Tor those of ordinary skill in the art, several improvements and modifications can be made without departing from the principle of the present invention. These improvements and modifications should also be regarded as the protection scope of the present invention.

What is claimed is:

1. An electromagnetic lock release mechanism for separating a satellite from a rocket, comprising: a frame (1), an ejection unit, a satellite unit, a lock release unit, and a lock release drive unit; wherein a horizontal direction is defined as an X direction, and a vertical direction is defined as a Y direction;

the satellite unit comprises a satellite (7), a positioning pin (8), and a satellite boss (9); wherein the satellite (7) is fixed to the satellite boss (9) through the positioning pin (8);

the ejection unit is arranged below the satellite unit to provide the satellite unit with an ejection force along a positive Y direction; the ejection unit comprises an ejection spring (2), an ejection jack (3) and a spring sleeve (4); the spring sleeve (4) is fixed to the frame (1); the ejection spring (2) is arranged in the spring sleeve (4); a bottom of the ejection jack (3) is located in the spring sleeve (4) and presses against the ejection spring (2); a top of the ejection jack (3) passes through the spring sleeve (4) and extends to be in contact with a bottom surface of the satellite unit; under a locked state, the ejection spring (2) is pressed by the ejection jack (3), and the ejection spring (2) provides the satellite unit with the ejection force along the positive Y direction through the ejection jack (3); under a released state, with the ejection force of the ejection spring (2), the satellite unit moves in the positive Y direction, so as to be separated from the frame (1);

the lock release unit comprises a locking pin (10), a locking slider (11), an unlocking spring (12), and a base (13);

the base (13) is located on a left side of the satellite unit and is fixed to the frame (1); a right side of the base (13) has a first cavity; a top surface of the satellite boss (9) is an inclined surface; under the locked state, the locking pin (10) is partially located in the first cavity, and a cylindrical surface of the locking pin (10) presses against the inclined surface of the satellite boss (9), thereby restricting movement of the satellite boss (9) in the positive Y direction; the inclined surface of the satellite boss (9) also provides the locking pin (10) with a contact elastic force along a normal direction of the inclined surface; the contact elastic force is decomposed into a contact elastic force in the positive Y direction and a contact elastic force in a negative X direction; the contact elastic force in the positive Y direction presses the locking pin (10) against the base (13); the contact elastic force in the negative X direction presses the locking pin (10) against the locking slider (11) behind the locking pin (10);

a left side of the base (13) has a guide groove along the Y direction, and the locking slider (11) is arranged in the guide groove to move only in the Y direction; the unlocking spring (12) is arranged between the locking slider (11) and the base (13) to provides the locking slider (11) with a thrust along the positive Y direction;

a bottom part of the locking slider (11) has a cavity along the X direction; the locking slider (11) is located behind the locking pin (10); under the locked state, a plane part at a top part of the sliding block (11) presses against a rear surface of the locking pin (10); under the released state, the unlocking spring (12) drives the locking slider (11) to move in the positive Y direction, so that the cavity of the locking slider (11) rises; under the contact elastic force in the negative X direction provided by the satellite boss (9), the locking pin (10) moves along the negative X direction and enters the cavity of the locking slider (11), so that the locking pin (10) releases a movement restriction to the satellite unit;

the lock release drive unit comprises: an electromagnet limit nut (14), an electromagnet moving core (15), and an electromagnet (16); the electromagnet (16) is fixed to the frame (1) and has a built-in coil; the electromagnet moving core (15) is arranged along the X direction; when the built-in coil of the electromagnet (16) is de-energized, a right end of the electromagnet moving core (15) presses against a top end of the locking slider (11), so as to restrict the locking slider (11) from moving in the positive Y direction; when the built-in coil of the electromagnet (16) is energized, the electromagnet moving core (15) moves in the negative X direction to release the locking slider (11), so that the unlocking spring (12) drives the locking slider (11) to move in the positive Y direction.

2. The electromagnetic lock release mechanism, as recited in claim 1, further comprising: a limit bracket (17) which is fixedly installed above the locking slider (11), so as to restrict a moving distance of the locking slider (11) along the positive Y direction.

3. The electromagnetic lock release mechanism, as recited in claim 1, further comprising: a pre-tensioning unit; wherein the pre-tensioning unit comprises: a pretensioner support (5) and a pretensioner (6);

the pretensioner support (5) is fixed to the frame (1); the pretensioner (6) is connected to the pretensioner support (5) by a pre-tensioning screw; the pretensioner (6) is located under the satellite boss (9); by rotating the pre-tensioning screw, the pretensioner (6) is moved in the positive Y direction until a top part of the pretensioner (6) is in contact with a bottom surface of the satellite boss (9); meanwhile, during tightening of the pre-tensioning screw, the pretensioner (6) pushes the satellite boss (9) to move in the positive Y direction, so that a contact between the satellite boss (9) and the locking pin (10) is elastically deformed to eliminate a contact gap.

4. The electromagnetic lock release method according to claim 1, comprising steps of:

step 1, before the rocket reaches a predetermined orbit, locking the satellite with the rocket, which comprises specific steps of:

step 1.1, energizing the built-in coil of the electromagnet (16), so that the right end of the electromagnet moving core (15) presses against the top end of the locking slider (11), wherein the locking slider (11) is located at a bottom of the guide groove;

step 1.2, after the locking slider (11) is located at the bottom of the guide groove, pressing the plane part at the top part of the sliding block (11) against the rear surface of the locking pin (10) to restrict the locking pin (10) from moving along the negative X direction, so that a right end of the locking pin (10) protrudes from the first cavity of the base (13); and step 1.3, then pressing the cylindrical surface of the locking pin (10) against the inclined surface of the satellite boss (9), thereby restricting the satellite boss (9) from moving along the positive Y direction; meanwhile, driving the ejection jack (3) with the ejection spring (2) to provide the satellite unit with the ejection force along the positive Y direction, wherein the ejection force is less than a force applied by the locking pin (10) to the satellite boss (9), so as to lock the satellite unit on the frame (1) with a combination of the locking pin (10) and ejection jack (3); and step 2, after the rocket enters the predetermined orbit, giving a separation instruction to safely release the satellite, which comprises specific steps of:

step 2.1, after the rocket enters the predetermined orbit, giving the separation instruction to de-energizing the built-in coil of the electromagnet (16);

wherein when the built-in coil of the electromagnet (16) is de-energized, the electromagnet moving core (15) moves in the negative X direction, so that the right end of the electromagnet moving core (15) leaves the top end of the locking slider (11), thereby releasing the locking slider (11) in the Y direction;

step 2.2, after the electromagnet moving core (15) releases the locking slider (11) in the Y direction, driving the locking slider (11) to move in the positive Y direction with the unlocking spring (12), and using a limit bracket (17) to restrict a moving distance of the locking slider (11), so that the cavity of the locking slider (11) rises to a certain height;

step 2.3, after the cavity of the locking slider (11) rises to the certain height, releasing the locking pin (10) in the negative X direction;

wherein the locking pin (10) moves in the negative X direction due to the contact elastic force in the negative X direction provided by the inclined surface of the satellite boss (9), and partially enters the cavity of the locking slider (11), so that the locking pin (10) releases the satellite boss (9) in the positive Y direction; and step 2.4, after the locking pin (10) releases the satellite boss (9) in the positive Y direction, moving the ejection jack (3) along the positive Y direction under the ejection force of the ejection spring (2), so as to safely release the satellite by ejecting and launching the satellite unit containing the satellite boss (9) in the positive Y direction.

* * * * *